E. C. STAFFORD.
TRAIN STOP SYSTEM.
APPLICATION FILED APR. 21, 1915. RENEWED NOV. 3, 1919.
1,327,176.
Patented Jan. 6, 1920.
6 SHEETS—SHEET 6.
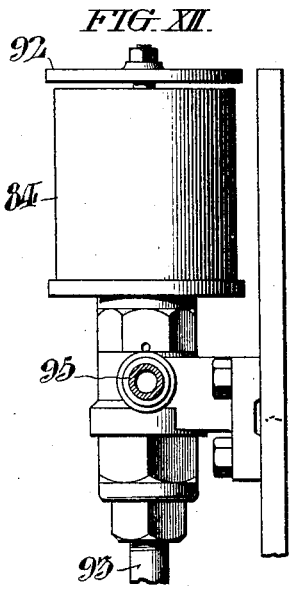
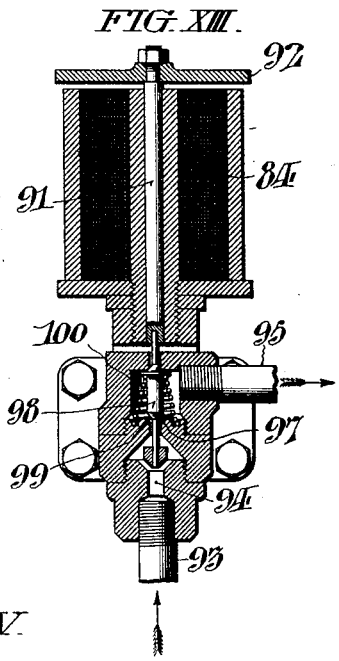
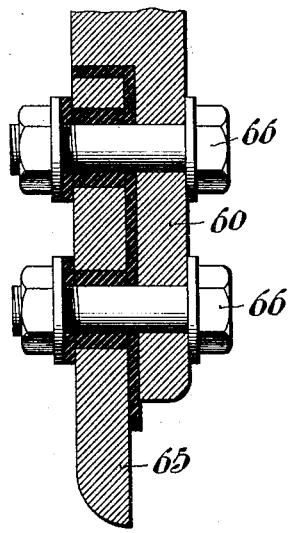
Inventor
Earl C. Stafford,

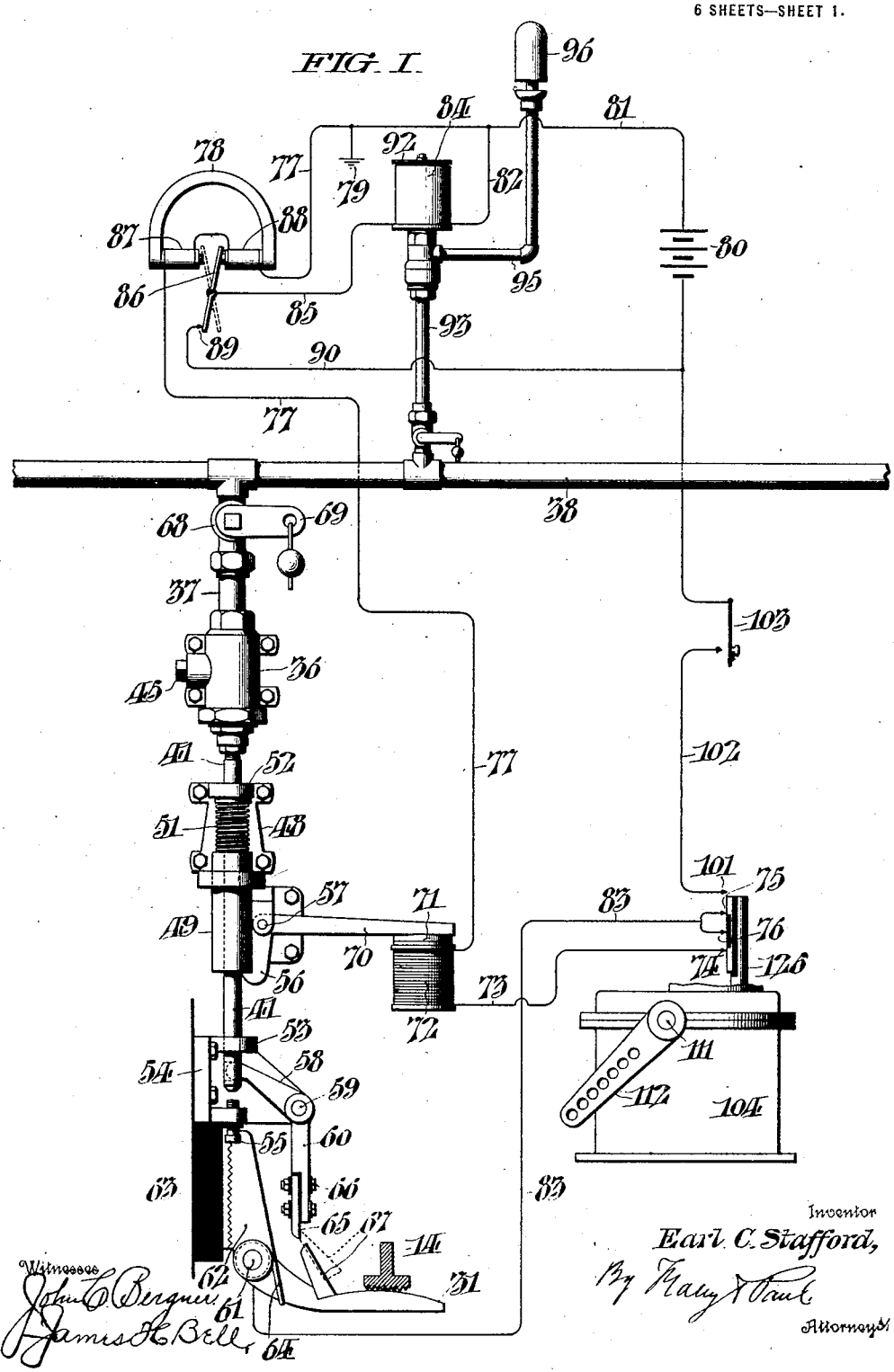

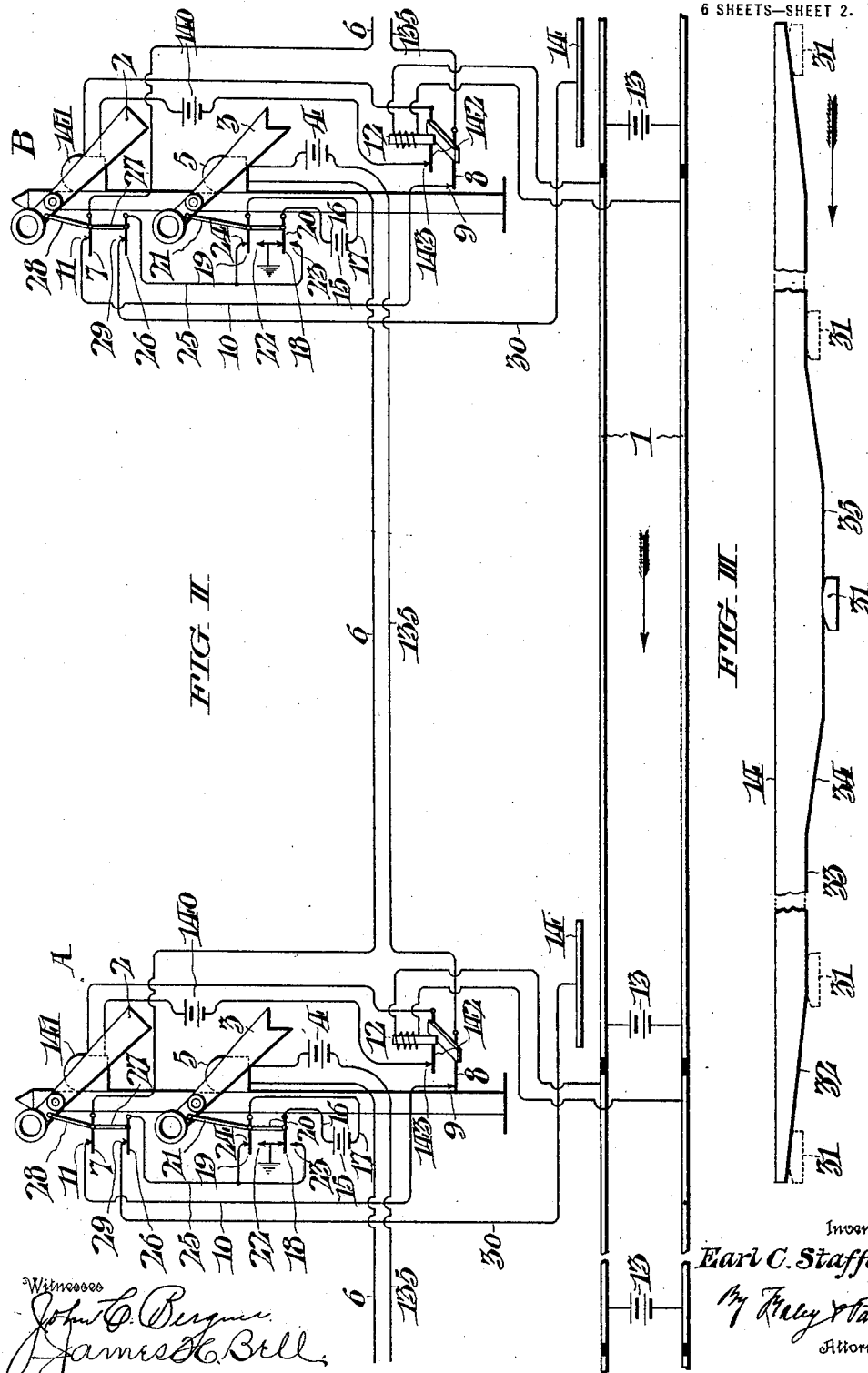

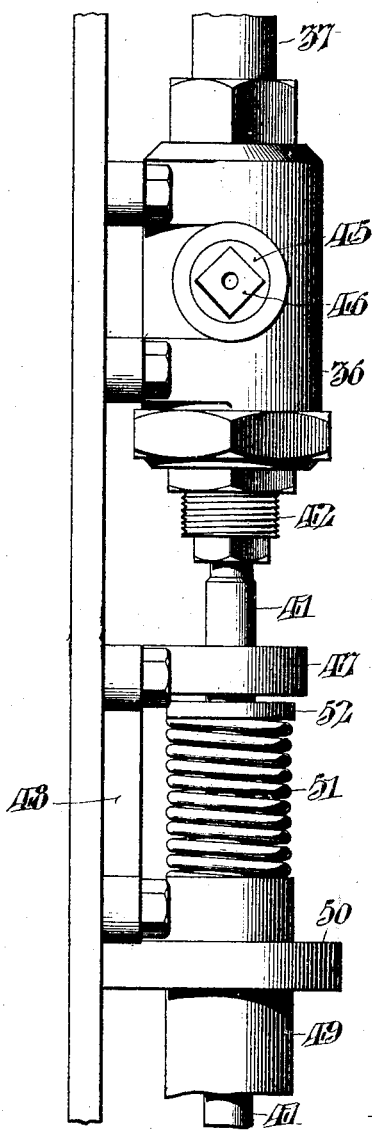
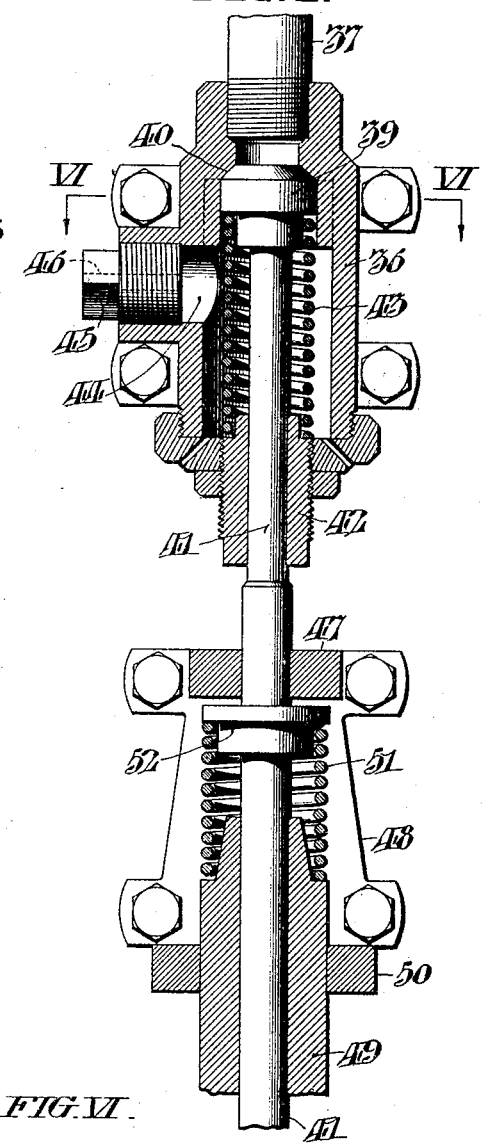
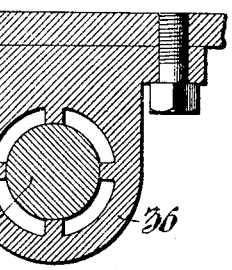

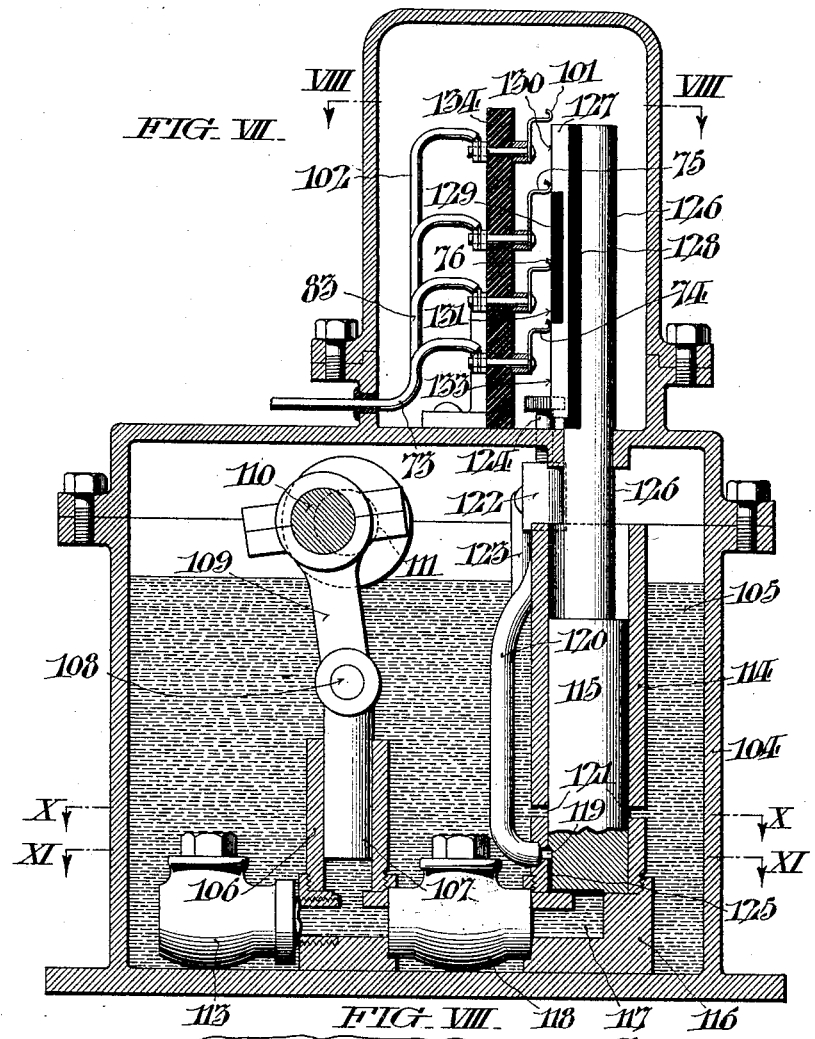

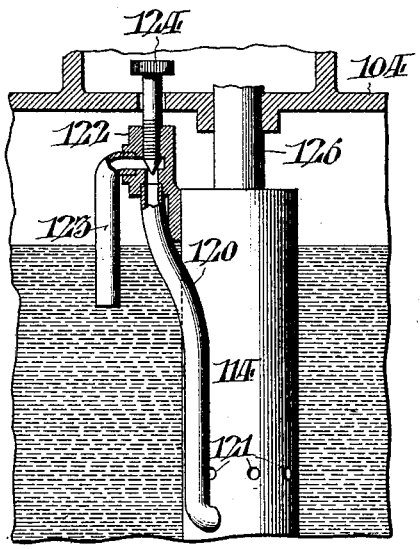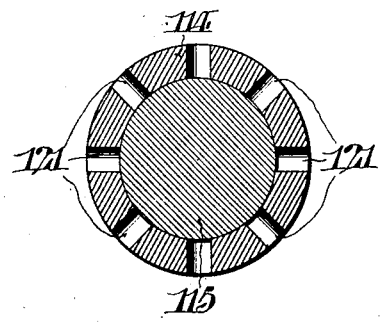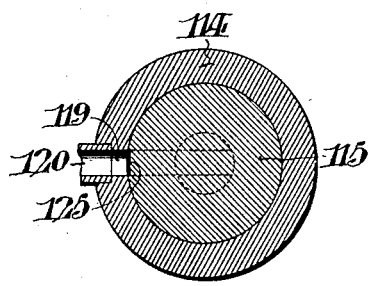

UNITED STATES PATENT OFFICE.

EARL C. STAFFORD, OF PHILADELPHIA, PENNSYLVANIA, ASSIGNOR TO THE RAILWAY AUTOMATIC SAFETY APPLIANCE COMPANY, OF PHILADELPHIA, PENNSYLVANIA, A CORPORATION OF DELAWARE.

TRAIN-STOP SYSTEM.

1,327,176.     Specification of Letters Patent.     Patented Jan. 6, 1920.

Application filed April 21, 1915, Serial No. 22,775. Renewed November 3, 1919. Serial No. 335,509.

*To all whom it may concern:*

Be it known that I, EARL C. STAFFORD, a resident of Philadelphia, in the county of Allegheny and State of Pennsylvania, have invented certain new and useful Improvements in Train-Stop Systems, whereof the following is a specification, reference being had to the accompanying drawings.

The invention relates more particularly to an automatic train stop system, wherein the brakes are controlled automatically by the setting of the signals, and wherein under certain conditions, signals are given in the cab of the engine.

An object of the invention is to provide a system of the above character, wherein the return circuit of the electrical circuits controlling the train stop, is through ground, and operates to prevent the application of the brakes, so that the brakes will be applied if a short circuit occurs, or the current is for any reason interrupted.

A further object of the invention is to provide a controlling system for stopping the train when a home signal is set at stop, with devices whereby the engineer may prevent the application of the brakes if the train speed is below a predetermined limit.

A further object of the invention is to provide a system of brake control wherein a mechanical interlocking mechanism for preventing the application of the brakes, may be successfully used with an electrical interlocking mechanism for preventing the application of the brakes, when the train is traveling above a predetermined speed, and wherein the electrical interlocking mechanism may be controlled by the setting of the signals.

A still further object of the invention is to provide a system of the above character wherein a third rail may be utilized as a means common to the mechanical control, as well as to the electrical control for operating each control.

These and other objects will in part be obvious, and will in part be hereinafter more fully disclosed.

In the drawings which show by way of illustration one embodiment of the invention, Figure I, is a view more or less diagrammatical, showing the automatic train stop, the cab signal, the speed control, the third rail shoe, and the circuits for the several devices.

Fig. II, is a similar view showing the track, the third rail, two signaling stations, and the batteries and circuits at each station.

Fig. III, is a view in side elevation showing the third rail, and the manner of controlling and operating the shoe therefor.

Fig. IV, is a view in side elevation of a portion of the automatic train stop.

Fig. V, is a longitudinal sectional view of the same.

Fig. VI, is a transverse sectional view on the line VI, VI, of Fig. V.

Fig. VII, is a longitudinal view through the speed controlled mechanism.

Fig. VIII, is a view on the line VIII, VIII, of Fig. VII.

Fig. IX, is a detail showing in longitudinal sectional view the adjusting mechanism for the speed control.

Fig. X, is a sectional view on the line X, X, of Fig. VII.

Fig. XI, is a sectional view on the line XI, XI, of Fig. VII.

Fig. XII, is a side elevational view of the controlling devices for the signal in the cab.

Fig. XIII, is a longitudinal sectional view of the same.

Fig. XIV, is a detail in section of the locking lever for the automatic train stop.

General features.

The invention consists generally in providing an automatic train stop, which is locked against action, and is held in locked position, either by a mechanical controlling mechanism, or an electrical controlling mechanism. This electrical controlling mechanism operates at intervals, and the mechanical controlling mechanism is effective to prevent the release of the automatic train stop between the intervals of electrical control. In other words, the mechanical control of the train stop is released by the third rail, and the electrical control of the train stop is brought about through the contact of a shoe with the third rail. This electrical control of the train stop which occurs at each signal station operates in conjunction with the signals, and the electrical control also depends upon the speed of the train. If the speed is above a predetermined limit, and neither the home nor distant signals are set at stop or caution, then the third rail shoe is energized and will cause the electrical control to become effective to prevent the application of the brakes. If a distant signal is set at caution, the third rail is likewise energized and the electrical control again becomes effective to prevent the release of the automatic train stop as the circuit for the third rail is controlled solely by the home signal. The shifting of the distant signals, however, to caution position, changes the poles of the circuit, and this change of polarity of the circuit causes through the third rail contact and polarized relay, a signal to be given in the cab.

If a home signal is set at danger, however, or if the apparatus becomes ineffective in any way, through the failure of the battery or a ground in the circuits, then the electrical control is destroyed, or becomes ineffective to prevent application of the brakes, and the train will be automatically stopped when the mechanical control of the brakes is rendered ineffective.

In conjunction with the above devices, there is a speed controlled mechanism which renders the electrical control above referred to, ineffective below certain predetermined speeds if the train is moving. This speed control at this period also renders effective a separate or auxiliary control referred to as the engineer's battery control, whereby the engineer through the closing of a hand switch, may prevent the application of the brakes when the mechanical control is released, regardless of whether any signals are set or not. In other words, when the speed of the train is below say ten miles per hour, the train may pass any of the signal stations, provided the engineer closes his hand switch, as he is passing through the third rail contact. This permits the engineer to pass stations, but not without calling his attention to the fact that he is passing the signal station, for the reason that it is necessary for him to close the hand switch, to prevent the application of the brakes.

Referring more particularly to the embodiment shown in the drawings, the various features referred to in the general way above, will be described in detail.

*Signal station circuits.*

Referring more particularly to Figs. II, and III, we have shown more or less diagrammatically two signaling stations, indicated at A and B. The rails of one of the tracks are indicated at 1, 1, and the direction of travel is indicated by the arrow. For the purpose of description, the upper signal 2, in each station, will be referred to as the home signal, while the lower signal 3, in each station, will be referred to as the distant signal. These signals are automatically set at danger by gravity when the circuits through their actuating motors are broken, as will be more fully understood from the description which follows.

There is at the station B, a battery 4. Leading from one terminal of the battery 4, is a line which is connected to a motor indicated at 5; the line 6, leads from the motor to a contact 7, at station A; the line 135, from the other terminal of the battery 4, leads to a contact 8. The coöperating contact 9, is connected through the line 10, with the contact 11, which coöperates with the contact 7. The contacts 8, and 9, are controlled by an electro-magnet or track relay 12, which is in circuit with the rails of track and battery 13, which is located at the far end of the block.

The track is divided into blocks and these blocks are insulated from each other in the well-known manner. When a train enters a block, the battery 13, of that block is short circuited, thereby causing the magnet 12, of the corresponding signal station to be deënergized, which results in opening the contacts 8, and 9. These contacts 8, and 9, as above noted, control the circuit of a battery at the distant signaling station, which battery operates the motor to hold the distant signal lowered or in clear position at that station. As soon as the contacts are separated, the circuit is broken and the signal moves at once by gravity to the caution position.

A battery 140, operates a motor 141, which in turn holds the home signal set at clear position. The circuit of the battery 140, is controlled by the contacts 142, and 143, and these are in turn controlled by the magnet 12. When the magnet is deënergized by a train entering the block and short circuiting the battery 13, the contacts 142, and 143, are opened, breaking the circuit of the battery 140, and permitting the home signal 2, to swing by gravity to danger position.

It will thus be seen that as long as there is a train in the block the home signal is set at danger and the distance signal is set at caution. As soon as the train leaves the block, the battery 13, closes the contacts 8, and 9, and also 142, and 143, thereby reëstablishing the circuits through the respective motors and causing the signals referred to, to be moved to clear position. Inasmuch as these signals are set by gravity, it will be apparent that any breaking of the circuit or failure of the battery, or any failure of the signaling system will cause a setting of the signals at stop and caution position, respectively.

There is a third rail 14, at each station. This third rail is set opposite the end of the block in rear of the block connected to the signal station, that is to say, the third rail 14, for signal station A, is adjacent the end of the block controlled by the signal station B. This third rail is in a battery circuit which is controlled by the home signal at the signaling station A. This battery is indicated at 15, and has its terminals connected to the lines 16 and 17. The line 16, is connected to a movable contact member 18, while the line 17, is connected to a movable contact member 19. These movable contacts are joined by a connecting link 20, and said contacts are simultaneously shifted through a connection 21, with the distant signal 3.

Coöperating with the movable contacts 18, and 19, are two contacts 22, which are grounded. Coöperating with the movable contact 18, is a fixed contact 23, while coöperating with the movable contact 19, is a fixed contact 24. These contacts 23, and 24, are connected to a common line 25. The purpose of the contacts thus described, is for reversing the polarity of the circuit, under certain conditions for the purpose of causing a signal in the cab, when the caution signal is set, and for preventing the signal in the cab when the said signal is clear. The line 25, is connected to the movable contact 26, and this movable contact is joined by a link 27, to the movable contact 7, and these two contacts are connected through the link 28, with the home signal 2. Coöperating with the movable contact 26, is a fixed contact 29, which is connected to a line 30, leading to the third rail 14. These circuits above specified are the same at each signal station.

When the signals at the station B, for example, are in the position shown in the drawing, neither signal is set at stop or caution, and one terminal of the battery 15, is connected through the line 16, the contact 18, and the contact 22, to ground, while the other terminal of the battery is connected through the line 17, movable contact 19, fixed contact 24, line 25, movable contact 26, and line 30, to the third rail 14, so that the third rail is energized by a current of certain polarity.

Also let us suppose that the distant signal is set at caution at this station, while the home signal remains in the position shown in the drawings. This would occur when the train enters the block controlled by station A.

By this setting of the distant signal at caution, the contacts 18, and 19, are shifted and then one terminal of the battery is connected through line 17, and contact 22, to ground, while the other terminal of the battery is connected through movable contact 18, fixed contact 23, line 25, contact 26, and line 30, to the third rail 14. The third rail is thus still energized from the battery 15, but the polarity of the circuit therethrough has been changed.

The purpose of this as above referred to, is to render effective the signaling mechanism in the cab, when a distant signal is set at caution. This signaling system will be described in full later.

The third rail 14, is adapted to coöperate with a shoe 31, which is carried by the engine. The under face of this third rail is formed with an inclined surface 32, a substantially horizontal surface 33, a second inclined surface 34, at each end thereof, and these surfaces join the central horizontal surface 35. The lower face of the third rail is corrugated as clearly shown in Fig. I, so that in the event of ice or sleet formation, the latter will be readily removed by the shoe coming in contact with the rail.

In Fig. III, of the drawings, the contact shoe is indicated in full lines at the central position, and in dotted lines in several other positions on the third rail and the arrow indicates the direction of travel of this contact shoe. As soon as the contact shoe engages the third rail, there is a longitudinal connection between the two. The particular shaping of the under face of this third rail above referred to, is for the purpose of forcing the shoe downward, to control the mechanical interlocking of the automatic train stop, as will be hereinafter described.

*Automatic train stop.*

In Figs. I, IV, V, and VI, of the drawings, I have shown an automatic train stop, which consists of a valve chamber 36. This valve chamber is connected with a pipe 37, which, in turn is connected with the train pipe 38. Located within the chamber 36, is a valve 39, which engages a valve seat 40. A rod 41, supports the valve, and extends through a sleeve 42, which is adjustably mounted in the cap, closing the lower end of the valve chamber. The rod 41, slides freely in this sleeve 42, and is forced upwardly by a spring 43, which engages at one end, the under face of the valve, and at the other end, the sleeve 42, which may be adjusted for the purpose of increasing or decreasing the tension of the spring 43.

An outlet 44, for the valve chamber, is closed by a plug 45, having an opening 46. This plug may be readily removed and a plug having a different sized opening or aperture 46, therethrough substituted so as to vary the control of the release of the air through the valve chamber. The valve rod 41, extends through a guiding lug 47, carried by a bracket 48, and also through a sleeve 49, which, in turn, is mounted in a lug 50, carried by the bracket 48. The rod slides freely in this sleeve 49. A spring 51, rests on the sleeve 49, and bears against a collar 52, which is attached to the valve rod. The valve rod 41, extends through another guiding lug 53, which is carried by a bracket 54, and is in line with the adjustable screw 55, which will limit the downward movement of the valve rod, under the action of the air against the valve when the tension of the spring 51, is released. The sleeve 49, is shiftable vertically in the guiding lug 50, and may be held in raised position by a swinging latch 56, which is pivoted at 57, to the bracket 48. When the sleeve 49, is raised and the spring 51, operates under compression, the valve 39, is held seated. When, however, the sleeve 49, is released, and the spring 51, becomes substantially ineffective, the air pressure is then sufficient to overcome the tension of the spring 43, and will open the valve 39, and thus release the air, and permit the setting of the brakes. Adjacent its lower end, the valve rod 41, is provided with a slot which engages the outer end of a rocker arm 58. This rocker arm is pivoted at 59, to the bracket 54, and has a downward projecting arm 60. The third rail shoe 31, is pivoted at 61, to a supporting plate 62, which may be adjustably attached to a supporting block 63, which is preferably insulated or of insulating material, so as to prevent grounding of the shoe through its supporting connection. A spring 64, co-operates with the supporting arm for the shoe 31, and normally holds the same raised. At the lower end of the arm 60, is a plate 65, which is insulated from, but rigidly attached to, the arm 60, by suitable bolts 66, see Fig. XIV.

When the shoe 31, is in the position shown in Fig. I, of the drawings, the rocker arm 58, is released, and the valve rod 41, is free to move up and down, except for the controlling latch 56. If this latch 56, is ineffective, then the air will open the valve and permit the application of the brakes, while on the other hand, if the latch is effective, then the release of the rocker arm 58, merely shifts the control of the automatic train stop to the latch 56. If the shoe 31, is raised through the action of the spring 64, an upwardly projecting arm 67, carried by the shoe 31, will engage the plate 65, and will prevent the arm 58, from swinging, and the shoe 31, thus becomes effective to hold the valve 39, closed to prevent the application of the brakes. In other words, when the shoe 31, is out of contact with the third rail 14, it is effective at all times to prevent the application of the brakes by the automatic train stop. While the shoe is in contact with the third rail, it is drawn downward, so as to mechanically release all control of the automatic train stop. The shaping of the third rail 14, as above described, is for the purpose of swinging this shoe gradually to releasing position. When the shoe first contacts with the third rail at the outer end thereof, it is in its extreme upper position, and is operative to prevent the release of the train stop. As the shoe moves along the third rail, it is gradually lowered to a position where the arm 67, becomes ineffective, and all mechanical control of the train stop through this particular position of the shoe 31, is cut out. Located in the pipe 37, is a valve 68, which is controlled by an arm 69, which may be sealed in any well known way. If the train stop becomes ineffective for any reason, the seal of the valve may be broken, and the train stop entirely cut out, which will enable the engineer to proceed, but which will also indicate to an engine inspector, that for some reason the train stop has become deranged and requires attention as to repairs.

The shoe 31, through the devices controlled thereby, provides a mechanical controlling mechanism for interlocking the automatic train stop, so as to prevent the release thereof, when said shoe is out of contact with the third rail, and this is during the periods of time between signal stations. When a signal station is reached, and the shoe makes contact with the third rail, it is swung, so as to release its mechanical control of the automatic train stop for a certain interval of time. It is during this interval or period of time, that the control of the train stop is shifted to an electrical interlocking device, governed by the setting of the signals if the train is traveling above a predetermined speed.

*Electrical control of train stop by setting of signals.*

The electrical controlling mechanism operates through the latch 56. Formed integrally with the latch 56, is an arm 70, which extends outwardly from the bracket and carries an armature 71, held in operative relation to a magnet 72. One terminal of the coil of the magnet 72, is connected to a line 73, which in turn is connected to a contact 74, in the speed controlling mechanism, which will be hereinafter described. This contact 74, is at times connected either with the contact 75, or with the contact 76, and these contacts are connected to a line which leads to the shoe 31.

The other terminal of the coil of the electro-magnet is connected through a line 77, with a relay 78, and the ground at 79.

Let it be assumed that the lines 73, and 83, are connected through the speed control mechanism, which happens when the train is in motion, if the train is traveling above a predetermined speed. This predetermined speed is fixed at approximately ten miles per hour, any speed below this point being considered a safe speed of travel, regardless of the conditions of the signals. Above this speed the automatic electrical control for the train stop mechanism is established by connecting the lines 73, and 83.

If distant signals are set at caution, then the third rail which is energized from the battery 15, as described above, will energize the coil 72, attract the armature 71, and hold the latch 56, in engagement with the sleeve 49, thus holding the spring 51, compressed, and preventing the setting of the brakes, when the mechanical control is released by the downward swinging of the shoe 31. It will be noted that the third rail is so shaped that the shoe 31, will make contact with the rail, and establish a circuit in the coil of the magnet 72, so as to hold the brakes from being applied, prior to forcing the shoe downward, so as to release the mechanical control.

As soon as the shoe passes from the third rail, then the circuit is broken, but the mechanical control prevents application of the brakes, and the batteries are therefore in circuit only while the shoe is passing along the rail. At this time the only thing which prevents the release of the automatic train stop is the current through the third rail, which energizes the coil of the magnet 72.

If a short circuit develops on the line leading to the third rail, or the batteries become ineffective for any reason, to properly energize the rail 14, then the coil of electro-magnet 72, will not be energized, and when the shoe is forced downward, so as to mechanically release the air, the brakes will be applied. In other words, if for any reason the system is out of order, when the train reaches a signal station, the automatic train stop will be released from mechanical control, and the train will be stopped.

This requires the entire train stop system to be in perfect working condition, in order that a train may pass a signal station, without a brake application.

If both the home and distant signals are set at clear, the third rail is likewise energized, and a similar action occurs, as above described, that is, the coil of the magnet 72, will be energized and prevent the release of the automatic train stop, when the mechanical control is rendered ineffective, through the passing of the shoe under the third rail.

If the home signal, however, at a signal station, is set at danger, then the third rail is deënergized as above described, and as soon as the shoe 31, passes under the third rail, the mechanical control will be released, and the electrical control broken, since the third rail is deënergized and the automatic train stop becomes effective to apply the brakes.

It will be apparent therefore, that under the conditions of clear signals, the automatic train stop will permit the engineer to pass a signal station, and also when there is a distant signal only set against him, but if he attempts to pass when a home signal is set at danger, the train will be automatically stopped.

When, however, the train is passing a signal station with a distant signal set at caution, a signal is given in the cab of the engine, and this is accomplished through the change in the polarity of the circuit, controlling the magnet 72.

*Caution signal in cab.*

Carried by the engine is a battery 80, one terminal of this battery 80, is connected through a line 81, with the line 77, and also with the line 82, which leads to one terminal of the coil of an electro-magnet 84, the other terminal of this coil being connected through a line 85, with the armature 86, which coöperates with the relay 78. The relay 78, is polarized and has two coils 87, and 88, between which the armature 86, swings. The lower end of the armature 86, carries a movable contact which coöperates with a fixed contact 89, which fixed contact is connected through the line 90, with the other terminal of the battery 80. The electro-magnet 84, has a central non-magnetic slide rod 91, which is fixed to an armature 92.

Leading from the train pipe 38, is a pipe 93, which is connected with a valve chamber 94. Leading from the valve chamber 94, is a second pipe 95, which is connected with a whistle or other suitable signal 96. The valve 97, is connected to a valve rod 98, and is adapted to engage the valve seat 99. The valve rod 98, is also connected with the rod 91, of the electro-magnet 84. When the magnet is energized and the armature 92, pulled down, the valve 97, is seated, and prevents any escape of air through the pipe 93, into the pipe 95. The spring 100, normally tends to raise the valve. If the electro-magnet becomes deënergized, then the spring, together with the air pressure, will raise the valve, and the escape of the air through the pipe 95, will operate the signal.

The normal position of the armature 86, is shown in full lines in Fig. I. When in this position, the circuit is established at the contact 89, and the electro-magnet is energized, which prevents the operation of the signal 96. When both home and distant signals are set at clear position, the third rail is energized by a current of one polarity, which energizes the circuit leading to the coil 72, and through the line 77, to the relay 78, and to ground 79, the passing of the current of this stated polarity through the relay 78, holds the armature in the full line position shown in this figure, which, in turn, prevents the operation of the signal. When a distant signal is set at caution, then the polarity of the circuit through the third rail is reversed, and the circuit through the relay 78, is likewise reversed, and this change in the polarity of the circuit, will shift the armature to the dotted line position, thereby breaking the circuit at 89, deenergizing the magnet, and permitting the signal to be operated.

As soon as the third rail is passed, the armature 86, may be swung by hand or otherwise, to release the signal by reestablishing the circuit through the battery 80. From the above it will be apparent that when the signals are in the position shown in Fig. II, of the drawings, the train will pass a third rail, or a signal station, without operating any signal in the cab. If, however, the distant signal is set at caution, then when the train passes a signal station, a signal will be given in the cab by the circuits and apparatus above described. If a home signal is set at stop, then the third rail is deënergized and no signal is given in the cab, but the automatic train stop is released, thereby stopping the train.

*Electrical control of train stop at cab.*

As above noted, when the speed of the train is below a predetermined speed, say for example approximately ten miles an hour, then it is safe for a train to proceed, regardless of the signals set against it, whether it be a caution signal, or a stop signal, provided the engineer's attention is called to the condition of the signals. The speed control operates to cut-out the automatic electrical control of the train stop through the third rail when the train is moving below this predetermined speed. At this time this speed control also cuts out a battery circuit in the engine cab. This battery circuit is controlled by the contact 101, which is connected with a line 102. This line leads to one terminal of the battery 80, and a hand switch 103, is placed in the line 102. Considering the line 102, connected to the line 73, which occurs when the train is moving below this predetermined speed, then the battery 80, is connected through the lines 102, 73, to one terminal of the coil 72, while the other terminal of the battery is connected through the lines 81, 77, to the other terminal of the coil. If the hand switch 103, is closed, then the coil of the magnet 72, is energized, and the latch 56, held in operative position for preventing the release of the train stop. This battery circuit on the engine is controlled solely by the hand switch 103, and is entirely independent of the electrical control through the third rail, and therefore, entirely independent of the setting of the signals. If the signals be clear, or if the signal be at caution, or at danger, the engineer by closing the hand switch 103, may still prevent the release of the automatic train stop. This, however, is effected only when its circuit is connected with the line 73. This depends upon the speed control.

*Speed control mechanism.*

The speed control mechanism is shown diagrammatically in Fig. I, and is shown in detail in Figs. VII to XI, inclusive. Said speed control consists of a casing 104, which is practically closed, in which may be placed oil or any other desired operative fluid 105. Located within the casing is a pump barrel 106, in which reciprocates a piston or plunger 107. This piston is connected at 108, to a link 109, which coöperates with a crank 110, carried by a rock shaft 111. On the outer end of the rock shaft is an arm 112, which is connected through any suitable mechanism with an operating member of the engine, so that when said engine is moving along the track, the arm 112, will be oscillated and the speed of oscillations of the arm 112, will correspond to the speed of the engine. The pump barrel is connected through a check valve 113, with the pump formed in the casing 104. This check valve permits the oil or fluid to be drawn into the pump, or prevents the return of the same through the check valve to the chamber. Also located within the casing 104, is a cylinder 114, in which is a plunger 115. This cylinder is secured to a supporting base 116, in which supporting base is a port 117, which is connected through the check valve 118, with the cylinder of the pump. This check valve 118, prevents the return of the fluid to the pump. As the pump is operated, fluid is drawn into the pump and delivered through the port 117, to the cylinder 114, beneath the plunger 115, thereby raising the plunger. The cylinder is formed with a single outlet port 119, which is located a slight distance above the bottom of the cylinder. A pipe 120, connects with this port. The oil or fluid pumped into the cylinder 114, will at once raise the plunger until the port 119, is uncovered and then the oil will be forced through the pipe 120. If the amount of oil or fluid pumped is less than the capacity of the pipe 120, the plunger will rise no farther, but as soon as the amount of oil or fluid pumped is greater than the capacity of the pipe 120, then the plunger is raised still farther until the ports 121, are uncovered. The capacity of these outlet ports 121, is beyond the capacity of the pump at the highest speed of travel of the engine, so that the plunger will never be raised above the level of the upper edges of the outlet ports 121.

The capacity of the pipe 120, is varied by the following adjusting mechanism. Said pipe leads to a chamber bracket 122, to which is connected an outlet pipe 123, which delivers oil or fluid back into the main chamber. The needle valve 124, is threaded into the bracket 122, and the lower tapered end thereof is opposite the delivering end of the pipe 120. By adjusting this needle valve, the flow of oil from the pipe 120, may be varied, and thereby the capacity of the pipe varied. By adjusting the capacity of the pipe 120, the time at which the plunger 115, remains above the port 119, may be varied. The capacity of this pipe 120, may be set so that when the speed of the engine is ten miles per hour, or under, the plunger will be just above the port 119, and the oil delivered by the pump entirely taken care of by the pipe 120. As soon as the speed of the engine, however, increases above ten miles per hour, then the capacity of the pipe 120, is reached, and the plunger will at once be raised to a point in line with the upper edges of the ports 121. This predetermined speed at which the plunger is shifted may be readily varied by adjusting the needle valve.

As soon as the speed of the engine drops to ten miles an hour, or the capacity of the pipe 120, then the oil will be taken through the pipe 120, and this will permit the plunger 115, to sink or drop to a position with its lower end directly above the port 119. If the engine stops so that the delivering of the oil by the pump ceases, then the oil beneath the plunger will pass through a by-pass 125, and this will allow the plunger to descend to its extreme lower position as shown in Fig. VII. From the above description it will be apparent that this plunger is in the position shown in Fig. VII, when the engine is at rest. It will be raised so that the lower end is just above the port 119, when the engine is traveling at all speeds below the predetermined speed which has been referred to as ten miles per hour, and for all speeds above ten miles per hour, the plunger will be raised to the third position, where the lower end is substantially in line with the upper edges of the ports 121. Connected with the plunger 115, is a rod 126. This rod carries a plate 127, which is attached to the rod but insulated therefrom by insulation 128. The plate is also cut away and said cut away section is provided with insulation 129. This provides a metallic face 130, an insulated face 131, and a second metallic face 133, for the plate 127. The metallic faces 130, and 133, are electrically connected with each other. The contact 101, above referred to, is mounted in a block of insulating material 134, and is connected with a wire 102. The contacts 75, and 76, are likewise mounted in this supporting block 134, and are connected with a wire 83. The contact 74, is also mounted in this supporting block 134, and is connected with a wire 73. When the plate 127, is in the position shown in Fig. VII, the contact 101, is out of connection with the plate 127. The contacts 74, and 75, are joined through this plate 127. At this time the engine is at rest. The joining of the contacts 74, and 75, connects the lines 73, and 83, and this makes effective the electrical circuit through the magnet 72, from the third rail, provided the third rail is energized. If the engineer should stop with the shoe 31, in contact with the third rail, the mechanical support for the automatic train stop is released, but the electrical control thereof is established, provided this third rail is energized, which prevents the application of the brakes. As soon as the engine starts up the plunger 115, will at once be raised to the second position, wherein the oil is delivered through the pipe 120, and will remain in this position until the speed of the engine passes the predetermined point, which has been referred to above as ten miles per hour. This shifting of the plunger 115, causes the contact 101, to engage the surface 130, of the plate 127, and will cause also the contacts 75, and 76, to engage the surface 131, which is insulating material. In this position the line 83, is entirely cut out, while the lines 102, and 73, are connected. This cuts out the automatic electrical control of the train stop by the third rail, and also establishes the engineer's battery circuit with the magnet which controls the train stop. When a signal station is approached, if the hand switch 103, is closed, then the engine battery will prevent the release of the automatic train stop, as the shoe passes beneath the third rail. If, however, the hand switch 103, is not closed, then the passing of the shoe under the third rail will trip the train stop. The engineer's battery circuit is entirely independent of the third rail, and therefore, independent of the setting of the signals, so that a signal station may be passed at a speed less than ten miles per hour, regardless of the condition of the signals, without tripping the automatic train stop, provided the engineer closes his hand switch.

If the speed of the engine exceeds ten miles per hour, or the set capacity of the pipe 120, then the plunger 115, will be raised to the third position, with the lower end of the plunger just above the ports 121. In this position of the plunger, the contact 101, engages the face 131, of the insulating material, which entirely cuts out the engineer's control of the automatic train stop. At the same time, the contact 76, engages the face 133, and connects the lines 83, and 73, which establishes the automatic electrical control of the train stop.

From the above it will be apparent that I have provided a speed control which operates to place the automatic train stop wholly within the control of the engineer in the cab, when the train is traveling below a predetermined speed, and which removes the automatic train stop entirely from the control of the engineer in the cab, when the train is traveling above this predetermined speed.

*Operation of the system.*

It is hardly thought necessary to go into any great detail in the description of the operation of the entire system, as the operation of the various features has been described in detail in connection with the construction of the same. A brief summary, however, of the various contacts may be given as follows:

When the train is stopped, the engine battery control is cut out entirely. The mechanical control of the automatic train stop is in operation unless the shoe is underneath the third rail. Under the usual regulations, the engineer should not stop his train with the shoe in contact with the third rail, and, therefore, this mechanical control of the automatic train stop is safe. If, however, the engine should stop with the contact shoe under the third rail, if this third rail is energized, then the electrical control through the third rail will prevent the release of the automatic train stop. If a home signal is set at danger, the brakes would be tripped at this time.

If the train is running below the predetermined speed, which has been referred to for the purpose of illustration as ten miles per hour, the automatic electrical control from the third rail is cut out, and the engine battery control is rendered effective. When a signal station is passed and the shoe contacts with the third rail, the mechanical control of the train stop is released, and the brakes will be applied unless the engineer closes his hand switch, which causes the engine battery to prevent the release of the automatic train stop. This operation of closing the hand switch to pass a signal station is necessary regardless of the conditions of the signals, whether they are set at danger and caution or clear.

If the train is running at a speed above this fixed predetermined speed of ten miles per hour, then the engine battery control is cut out and the automatic electrical control through the third rail is established. This automatic third rail control is varied, or modified through the setting of the signals. If the signals are all clear, then the third rail is energized, and will operate through the magnet 72, to prevent the release of the automatic train stop. The polarity of the battery circuit at this time is such as to have no effect upon the signal in the cab. If the signal is set at caution, the third rail is still energized, but the polarity of the circuit has been reversed. The magnet 72, still operates to prevent the release of the automatic train stop, but the relay 78, breaks the battery circuit of the signaling device in the cab, and causes a signal to be given to the engineer, which attracts his attention to the fact that a caution signal is set against him. If a home signal is set at danger, then the circuit which energizes the third rail is broken, and as soon as the engine passes a third rail, the shoe engaging the said rail will release the mechanical control, and the brakes will be applied.

By providing electric circuits, wherein the ground forms the return circuit, if the circuit is grounded at any point, or broken, the third rail becomes at once deënergized and this would cause a setting of the brakes, if the train passes a third rail, at a speed beyond this predetermined speed of ten miles per hour. Furthermore, by providing electric circuits and a system wherein the electric current is depended upon to prevent the tripping of the automatic train stop, if for any reason the current ceases, then this electrical control becomes ineffective, and if the train passes the third rail at a signal station under these conditions, the train will be automatically stopped. This signifies to the engineer that something is wrong at the signal station, or something is wrong with the electrical controlling apparatus of the engine.

If anything should happen to the speed control mechanism, so that the plunger is not raised through the pumping of the oil, then the engineer's circuit is cut out, but the automatic electrical control through the third rail is established and is effective for all speeds of the train.

It is obvious that other changes in the details of construction and arrangements of the parts may be made without departing from the spirit of the invention, as set forth in the appended claims.

Having thus described my invention, I claim:

1. A train stop system comprising an automatic train stop, devices whereby said train stop may be operated by the signals at a signal station, said devices including an electrical apparatus rendered operative when the speed of the train is above a predetermined speed to release the automatic train stop through the setting of the signals and rendered operative when the speed is below such value to release the automatic train stop regardless of the condition of the signals, and means controlled by the engineer for preventing the release of said automatic train stop at any time when said train is traveling below said predetermined speed.

2. A train stop system, comprising an automatic train stop, devices whereby said train stop may be controlled by the signals at a signal station, said devices including an electrical apparatus rendered operative when the speed of the train is above a predetermined speed, to release the automatic train stop through the setting of the signals and rendered operative when the speed is below such value to release the automatic train stop regardless of the condition of the signals, and an apparatus controlled from the cab by the engineer, for preventing the release of the automatic train stop, when said train is traveling below said predetermined speed.

3. A train stop system, comprising an automatic train stop, devices whereby said train stop may be controlled by the signals at a signal station, said devices including an electrical apparatus for controlling the automatic train stop at intervals when the speed of the train is above a predetermined speed, mechanically operated mechanism for controlling the automatic train stop, between the intervals of control by said electrical apparatus, when said train is traveling above said predetermined speed, and means controlled by the engineer for preventing the release of said automatic train stop at any time when said train is traveling below said predetermined speed.

4. The combination of a series of signal stations, each including a distant signal and a home signal, of a train stop system comprising an automatic train stop, devices whereby said train stop may be controlled by the signals at a signal station, said devices including a mechanically operated mechanism for preventing the release of the automatic train stop, between signaling stations, means at the signaling stations for releasing said mechanical control, an electrically controlled apparatus operated at the signaling stations for controlling said automatic train stop when the train is traveling above a predetermined speed, said electrically operated apparatus including devices effective to prevent the release of the automatic train stop, when the home signal is clear, and when the distant signal is at caution.

5. A train stop system, comprising an automatic train stop, devices whereby said train stop may be controlled by the signals at a signal station, said devices including a mechanically operated mechanism for preventing the release of the automatic train stop, between signaling stations, means at the signaling stations for releasing said mechanical control, an electrically controlled apparatus operative at the signaling stations for controlling said automatic train stop, when the train is traveling above a predetermined speed, said electrically operated apparatus including devices effective to prevent the release of the automatic train stop when the signal is clear and when the distant signal is at caution, and means for breaking the circuit of said electrical apparatus when the home signal is set at danger, whereby said electrical apparatus is rendered ineffective to control the automatic train stop.

6. A train stop system, comprising an automatic train stop, devices whereby said train stop may be controlled by the signals at a signal station, said devices including a mechanically operated mechanism for preventing the release of the automatic train stop, between signaling stations, means at the signaling stations for releasing said mechanical control, an electrically controlled apparatus operated at the signaling stations for controlling said automatic train stop when the train is traveling above a predetermined speed, said electrically operated apparatus including devices effective to prevent the release of the automatic train stop, when the signal is clear, and when the distant signal is at caution, a signaling apparatus in the cab, and means whereby when said distant signal is set, the circuit through said apparatus may be changed as to polarity, and said signaling apparatus in the cab operated by the change in the polarity of the circuit of said controlling apparatus, whereby a signal is sounded in the cab, when the train passes the distant signal set at caution.

7. A train stop system, comprising an automatic train stop, devices whereby said train stop may be controlled by the signals at a signal station, said devices including a battery at each signaling station, a third rail, circuits whereby said battery may energize said third rail, when the signals are clear, or at caution, a controlling apparatus carried by the engine, including a battery and a contact shoe for engaging said third rail, an electro-magnet energized through said third rail, when the train is traveling above a predetermined speed and through the engine battery when traveling below said predetermined speed, and devices operated by said magnet for preventing the release of said automatic train stop when said third rail is energized.

8. A train stop system, comprising an automatic train stop, devices whereby said train stop may be controlled by the signals at a signal station, said devices including a battery at each signaling station, a third rail, circuits whereby said battery may energize said third rail, when the signals are clear, or at caution, a controlling apparatus carried by the engine, including a contact shoe for engaging said third rail, a battery and an electro-magnet energized through said third rail, when the train is traveling above a predetermined speed and through the engine battery when traveling below said predetermined speed said devices operated by said magnet for preventing the release of said automatic train stop when said third rail is energized, and means operated by the setting of a danger signal for breaking the circuit, through said third rail, whereby said electro-magnet becomes ineffective to prevent the operation of the automatic train stop.

9. A train stop system, comprising an automatic train stop, devices whereby said train stop may be controlled by the signals at a signal station, said devices including a battery at each signaling station, a third rail, circuits whereby said battery may energize said third rail, when the signals are clear, or at caution, a controlling apparatus carried by the engine, including a contact shoe for engaging said third rail, a battery and an electro-magnet energized through said third rail, when the train is traveling above a predetermined speed and through the engine battery when traveling below said predetermined speed, and devices operated by said magnet for preventing the release of said automatic train stop when said third rail is energized, and devices for automatically preventing the operation of said automatic train stop, when said shoe is out of contact with said third rail.

10. A train stop system, comprising an automatic train stop, devices whereby said train stop may be controlled by the signals at a signal station, said devices including a battery at each signaling station, a third rail, circuits whereby said battery may energize said third rail, when the signals are clear, or at caution, a controlling apparatus carried by the engine, including a contact shoe for engaging said third rail, a battery and an electro-magnet energized through said third rail, when the train is traveling above a predetermined speed and through the engine battery when traveling below said predetermined speed, and devices operated by said magnet for preventing the release of said automatic train stop when said third rail is energized, and mechanically controlled devices operated by said shoe for automatically preventing the release of the automatic train stop, when said shoe is out of contact with said third rail.

11. A train stop system, comprising an automatic train stop, devices whereby said train stop may be controlled by the signals at a signal station, said devices including a battery at each signaling station, a third rail, circuits whereby said battery may energize said third rail, when the signals are clear, or at caution, a controlling apparatus carried by the engine, including a contact shoe for engaging said third rail, a battery and an electro-magnet energized through said third rail, when the train is traveling above a predetermined speed and through the engine battery when traveling below said predetermined speed, said devices operated by said magnet for preventing the release of said automatic train stop when said third rail is energized, and means operated by the setting of a home signal at danger for breaking the circuit, through said third rail, whereby said electro-magnet becomes ineffective to prevent the operation of the automatic train stop, and mechanically controlled devices operated by said shoe for preventing the operation of said automatic train stop when said shoe is out of contact with said third rail.

12. A train stop system, comprising an automatic train stop, devices whereby said train stop may be controlled by the signals at a signal station, said devices including a battery at each signal station, a third rail adapted to be energized by said battery, when the signals are clear or at caution, mechanism controlled by said third rail, for preventing the release of said automatic train stop, a battery carried by the engine, mechanism adapted to be controlled by said battery, through a hand switch, for preventing the release of said train stop, and a speed controlled mechanism for rendering said engine battery control ineffective, when the speed of the engine reaches a predetermined point, and for rendering said signal station battery effective to control the release of the automatic train stop.

13. A train stop system, comprising an automatic train stop, devices whereby said train stop may be controlled by the signals at a signal station, said devices including a battery at each signal station, a third rail adapted to be energized by said battery, when the signals are clear or at caution, mechanism controlled by said third rail, for preventing the release of said automatic train stop, a battery carried by the engine, mechanism adapted to be controlled by said battery through a hand switch, for preventing the release of said train stop, and a speed controlled mechanism for rendering said engine battery control ineffective, when the speed of the engine reaches a predetermined point, and for rendering said signal station battery effective to control the release of the automatic train stop, and devices for preventing the release of the automatic train stop between signaling stations.

14. A train stop system, comprising an automatic train stop, devices whereby said train stop may be controlled by the signals at a signal station, said devices including a battery at each signaling station, a third rail adapted to be energized by said battery, when the signals are clear or at caution, an apparatus carried by the engine and including a contact shoe for engaging said third rail, for preventing the release of the automatic train stop, when said shoe is in contact with said third rail, and the speed of the engine is below a predetermined point, devices controlled by said shoe, for preventing the operation of said train stop when said shoe is out of contact with said third rail, a battery carried by the engine, and devices controlled by said battery for preventing the release of said automatic train stop, when said train is traveling below said predetermined speed, a speed controlled mechanism for rendering the control of the automatic train stop through the third rail effective, when said train is traveling above said predetermined speed, and for rendering the same ineffective when said train is traveling below said predetermined speed, and for likewise rendering the control of said automatic train stop from the engine battery, effective when said train is traveling below said predetermined speed, and ineffective when the train is traveling above said predetermined speed.

15. A train stop system, comprising an automatic train stop, devices whereby said train stop may be controlled by the signals at a signal station, said devices including a battery at each signaling station, a third rail, adapted to be energized by said battery, when the signals are clear or at caution, an apparatus carried by the engine, and including a contact shoe for engaging said third rail, for preventing the release of the automatic train stop, when said shoe is in contact with said third rail, and the speed of the engine is below a predetermined point, devices controlled by said shoe for preventing the operation of said train stop when said shoe is out of contact with said third rail, a battery carried by the engine, and devices controlled by said battery for preventing the release of said automatic train stop, when said train is traveling below said predetermined speed, a speed controlled mechanism for rendering the control of the automatic train stop through the third rail effective, when said train is traveling above said predetermined speed, and for rendering the same ineffective when said train is traveling below said predetermined speed, and for likewise rendering the control of said automatic train stop from the engine battery effective when said train is traveling below said predetermined speed and ineffective when the train is traveling above said predetermined speed, said automatic control of the train stop through the third rail also including devices, whereby the signal is sounded in the cab of the engine, when said shoe is in contact with the third rail and the train signal is set at caution.

16. A train stop system, comprising an automatic train stop, electrically controlled means for preventing the release of said train stop, a pivoted arm, a third rail shoe mounted thereon and electrically connected with said means for controlling the train stop, a rocker arm connected to said automatic train stop, and means carried by said shoe, whereby when said shoe is raised, said rocker arm is engaged, and the train stop held from being released when said electrical controlling means becomes ineffective.

In testimony whereof, I have hereunto signed my name, at Philadelphia, Pennsylvania, this fourteenth day of April 1915.

EARL C. STAFFORD.

Witnesses:
JAMES H. BELL,
E. L. FULLERTON.